Figure 1:
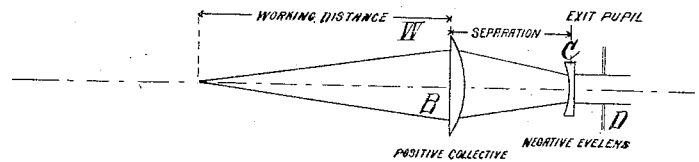

No. 853,812. PATENTED MAY 14, 1907.
H. C. LOMB.
EYEPIECE.
APPLICATION FILED FEB. 11, 1907.

WITNESSES:
Wm F Hoy
Lewis Hodges

INVENTOR
Henry C. Lomb
By E. B. Stocking
Attorney

UNITED STATES PATENT OFFICE.

HENRY C. LOMB, OF ROCHESTER, NEW YORK, ASSIGNOR TO BAUSCH AND LOMB OPTICAL COMPANY, OF ROCHESTER, NEW YORK, A CORPORATION OF NEW YORK.

EYEPIECE.

No 853,812.     Specification of Letters Patent.     Patented May 14, 1907.

Application filed February 11, 1907. Serial No. 356,812.

*To all whom it may concern:*

Be it known that I, HENRY C. LOMB, a citizen of the United States, residing at Rochester, in the county of Monroe, State of New York, have invented certain new and useful Improvements in Eyepieces, of which the following is a specification, reference being had therein to the accompanying drawing.

This invention relates to optical instruments, and more particularly to an improved eyepiece for such instruments, and the principal or basic object of the invention is to provide an eyepiece or eyepiece system which has a focal or working distance greater than the equivalent focal length thereof.

In an astronomical telescope, field glass and similar instruments the image formed by the objective is viewed and magnified by the eyepiece, the objective and eyepiece being so placed relatively to each other that the posterior focus of the former coincides with the anterior focus of the latter, and this anterior focus is situated very near to the eyepiece or actually in the interior thereof. In the latter case, the eyepiece is as a matter of course useless for measuring instruments where cross hairs or lines must be employed, preferably, for accuracy in the focus of the objective of the instrument. In the case of the location of the anterior focus of the eyepiece near to and slightly in advance of the collective lens of the eyepiece dust or foreign matter will be seen simultaneously with the image which is annoying and materially contributes to inaccuracy in measurements.

In certain forms of telescopes, field glasses and other optical instruments the image formed by the objective or objective system is at a considerable distance from the eyepiece, so much so that it is quite inaccessible. That is to say, the objective image cannot be focused with the eyepieces now in use by reason of the distant location of the image. This occurs, for example, in the case of a reversing system composed of prisms in which the erected image is practically virtual and is situated in the interior of the prisms.

The problem involved in my present invention is, in brief, to discover or provide a form of eyepiece whose anterior focus lies at a very considerable distance from its collective so that it can work through the prisms, when used, or a portion of them.

To take the problem in the most general way, inquiry is made in regard to the laws governing the combination of two lenses of focal lengths $f_1$ and $f_2$ respectively, placed at a distance $d$ apart, the resulting system to have a prescribed equivalent focal length $f$ and a prescribed focal or working distance $w$. It may be shown that the separation $d$ of the lenses must be $d = f_2\left(1 - \dfrac{w}{f}\right)$. From this equation it follows that if the working distance $w$ is to be greater than $f$, $f_2$ must be negative; whence it follows that an eyepiece composed of two lenses or lens systems of focal length $f_1$ and $f_2$ respectively must have for its second element a lens of negative focal length and separated from the other elements or lenses by a certain distance $d$ defined by the above equation to give a working distance $w$ longer than the equivalent focal length of the entire system. Herein lies the novelty of my form and construction of eyepiece. In addition to the above the focal lengths and separation of the combination of lenses of such an eyepiece are such that the exit pupil or eye-point of the complete system is so situated that the pupil of the eye may be brought into coincidence with it.

Other objects and advantages of the invention will be set forth in the following description and the novel features thereof will be particularly pointed out in the claims.

Figure 2:
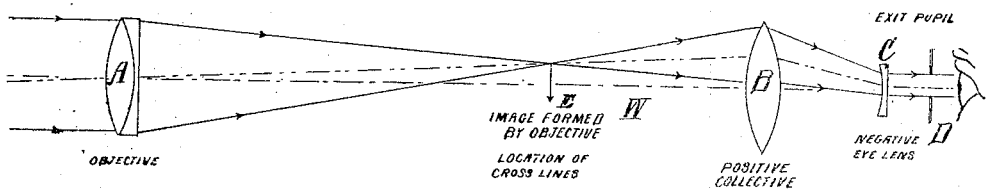
Figure 3:
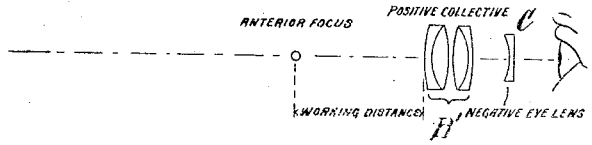

In the drawing:—Figure 1 is a diagrammatic illustration of an eyepiece constructed in accordance with my invention; Fig. 2 is a diagrammatic representation of the principal elements of a telescope provided with my improved eyepiece, and Fig. 3 is one of many modifications which may be employed in the elements of my improved eyepiece and their relative arrangement.

Like letters refer to like parts in the several figures of the drawing.

A, Fig. 2, represents the objective of an optical instrument. B the collective and C the eyelens of an eyepiece constructed in accordance with my invention and relatively arranged with each other and as a whole with the objective of the telescope.

For a clear understanding of the relative arrangement and individual characteristics of the elements of my eyepiece which is constructed in accordance with the formula above given reference is made to Fig. 1 wherein C is a negative lens, B the positive collective lens of the eyepiece and D is the exit pupil of the instrument. The optical function of the lenses mentioned when given the proper separation is to produce the working distance $w$, which is greater than the equivalent focal length of the system. From this arrangement and relation of the two elements of the eyepiece flow the advantages heretofore specified.

It is, of course, understood that the elements of the eyepiece may be modified in that the positive collective may be made up of a combination of lenses B′ cemented or uncemented and separated by an air space if desired so long as the eye lens C is actually negative in its character, as shown in Fig. 3. So also the negative lens C may be composed of several lenses in like manner.

Referring to Fig. 2, the image formed by the objective of the telescope is shown as an arrow E and it is in the plane of this image that the cross hairs or lines are located, and the working distance of the eyepiece shown extends to the same plane and consequently magnifies the image with the cross hairs or lines appearing distinctly thereon whereby accurate measurements can be accomplished. It will also be noted that the exit pupil of the instrument is exterior to the eyepiece and at a considerable distance therefrom so that the eye of the observer can be readily placed therein and at a point where the light is strongest and thus gives the greatest definition.

By the construction and relative arrangement of the principal elements of the eyepiece hereinbefore described the longest possible working distance is secured and one which is longer than the equivalent focal length of the entire eyepiece. The focal length of the eyepiece system is the distance between the posterior principal focus and the nodal point of emergence, or the distance between the anterior principal focus and the corresponding nodal point. The back focus has been designated as focal distance or working distance.

Having now described my invention and set forth its merits, what I claim and desire to secure by Letters Patent is:—

1. An eyepiece comprising two lenses one of which has a negative focal length and separated from the other to give a working distance longer than the equivalent focal length of the entire system.

2. An eyepiece comprising component lenses the equivalent focal length and separation of which is such as to bring the exit pupil or eye-point thereof to such a plane that the pupil of the eye of the observer may be brought into coincidence therewith.

3. An eyepiece comprising two positive lenses and a negative lens, the latter being the eyelens of the eyepiece and separated from the former whereby a working distance is produced longer than the equivalent focal length of said lenses.

4. The combination with the objective of an optical instrument, of an eyepiece system comprising a positive collective and a negative eyelens separated from each other to produce a working distance longer than the equivalent focal length of said lenses.

In testimony whereof, I affix my signature in presence of two witnesses.

HENRY C. LOMB.

Witnesses:
GEO. V. FLECKENSTEIN.
JAMES G. GREENE.